US012579653B2

(12) United States Patent　　　　(10) Patent No.:　US 12,579,653 B2
Tak et al.　　　　　　　　　　　　　(45) Date of Patent:　　Mar. 17, 2026

(54) AUTOMATED METHOD FOR TOOTH SEGMENTATION OF THREE DIMENSIONAL SCAN DATA USING TOOTH BOUNDARY CURVE AND COMPUTER READABLE MEDIUM HAVING PROGRAM FOR PERFORMING THE METHOD

(71) Applicant: IMAGOWORKS INC., Seoul (KR)

(72) Inventors: Seongjun Tak, Gwangmyeong-si (KR);
Eungjune Shim, Seoul (KR);
Youngjun Kim, Seoul (KR)

(73) Assignee: IMAGOWORKS INC., Seoul (KR)

( * ) Notice: Subject to any disclaimer, the term of this patent is extended or adjusted under 35 U.S.C. 154(b) by 472 days.

(21) Appl. No.: 18/087,846

(22) Filed: Dec. 23, 2022

(65) Prior Publication Data

US 2023/0206455 A1　　Jun. 29, 2023

(30) Foreign Application Priority Data

Dec. 29, 2021　(KR) ......................... 10-2021-0191835

(51) Int. Cl.
　　*G06T 7/12*　　　　(2017.01)
　　*G06T 7/73*　　　　(2017.01)
(52) U.S. Cl.
　　CPC .................. *G06T 7/12* (2017.01); *G06T 7/73* (2017.01); *G06T 2207/20084* (2013.01); *G06T 2207/30036* (2013.01)
(58) Field of Classification Search
　　CPC ... G06T 7/12; G06T 7/73; G06T 2207/30036; G10K 2210/116; G05B 2219/45167; G01N 2800/18
　　See application file for complete search history.

(56) References Cited

U.S. PATENT DOCUMENTS

2020/0175678 A1*　6/2020　Abraham ............... G16H 30/40

FOREIGN PATENT DOCUMENTS

| EP | 3767521 A | 1/2021 |
|---|---|---|
| JP | 2019524367 A | 9/2019 |
| KR | 10-2015-0039028 A | 4/2015 |
| KR | 10-2020-0120035 A | 10/2020 |
| KR | 10-2021-0124321 A | 10/2021 |
| KR | 10-2021-0131682 A | 11/2021 |
| WO | 2021155230 A1 | 8/2021 |

OTHER PUBLICATIONS

T. Jang et al., âA Fully Automated Method for 3D Individual Tooth Identification and Segmentation in Dental CBCT,â Published on Arxiv Dec. 3, 2021. (Year: 2021).*

(Continued)

*Primary Examiner* — Gregory A Morse
*Assistant Examiner* — Ty Mitchell Beatty
(74) *Attorney, Agent, or Firm* — LEEPI

(57)　　　　　ABSTRACT

An automated method includes detecting a tooth of the scan data using a first artificial intelligence neural network, extracting a tooth scan data from the scan data based on a result of a tooth detection, generating a tooth mapped data corresponding to a predetermined space based on the tooth scan data, generating the tooth boundary curve by inputting the tooth mapped data to a second artificial intelligence neural network and mapping the tooth boundary curve to the scan data.

17 Claims, 16 Drawing Sheets

Input image　　Initial box definition　　Diamond contour　　Deformation

Object shape　　Deformation　　Octagon contour　　Extreme points

(56) References Cited

OTHER PUBLICATIONS

X. Xu, C. Liu and Y. Zheng, "3D Tooth Segmentation and Labeling Using Deep Convolutional Neural Networks," in IEEE Transactions on Visualization and Computer Graphics, vol. 25, No. 7, pp. 2336-2348, Jul. 1, 2019, doi: 10.1109/TVCG.2018.2839685. (Year: 2019).*

Ran Gal and D. Cohen-Or, âSalient Geometric Features for Partial Shape Matching and Similarity,â in 2006. ACM Trans. Graph. 25, 1 (Jan. 2006). (Year: 2006).*

Jianda Zhang, Chunpeng Li, Qiang Song, Lin Gao, Yu-Kun Lai, âAutomatic 3D tooth segmentation using convolutional neural networks in harmonic parameter space,â Graphical Models, vol. 109, Year 2020, 101071, ISSN 1524-0703, (Year: 2020).*

3D Teeth Segmentation by Wongwaen et al., Pub. (ICEIE 2010) (Year: 2010).*

Segmentation of Dental Study Models by Kondo et al., Pub. IEEE, 2004 (Year: 2004).*

Europe International Search Report dated on Mar. 1, 2022.

Ran Gal et al, "Salient Geometric Features for Partial Shape Matching and Similarity", ACM Transactions on Graphics, vol. 25, No. 1, Jan. 1, 2006.

Zhang Jianda et al, "Automatic 3D Tooth Segmentation Using Convolutional Neural Networks in Harmonic Parameter Space", Graphical Models, vol. 109, May 1, 2020.

Jiang Xiaotong et al., "C2F-3DToothSeg: Coarse-to fine 3D tooth segmentation via intuitive single clicks" Computers and Graphics, Eslevier, GB, vol. 102, Aug. 31, 2021.

Korean International Search Report dated on Sep. 27, 2022.

Japanese Office Action issued on Apr. 1, 2025.

Xu Xiaojie et al., "3D Tooth Segmentation and Labeling Using Deep Convolutional Neural Networks", IEEE Transactions on Visualization and Computer Graphics, vol. 25, No. 7, Jul. 1, 2019.

* cited by examiner

FIG. 9

AUTOMATED METHOD FOR TOOTH SEGMENTATION OF THREE DIMENSIONAL SCAN DATA USING TOOTH BOUNDARY CURVE AND COMPUTER READABLE MEDIUM HAVING PROGRAM FOR PERFORMING THE METHOD

PRIORITY STATEMENT

This application claims priority under 35 U.S.C. § 119 to Korean Patent Application No. 10-2021-0191835, filed on Dec. 29, 2021 in the Korean Intellectual Property Office (KIPO) and International Patent Application No. PCT/KR2022/001535 filed on Jan. 27, 2022, the contents of which are herein incorporated by reference in their entireties.

BACKGROUND

1. Technical Field

Embodiments relate to an automated method for tooth segmentation of a three dimensional scan data using a tooth boundary curve and a non-transitory computer-readable storage medium having stored thereon program instructions of the automated method for tooth segmentation of the three dimensional scan data using the tooth boundary curve. More particularly, embodiments relate to an automated method for tooth segmentation of a three dimensional scan data using a tooth boundary curve in which teeth are detected through a deep learning, a mesh parameterization is operated for each tooth and the tooth boundary curve is generated in a mapped data of each tooth through a deep learning, and a non-transitory computer-readable storage medium having stored thereon program instructions of the automated method for tooth segmentation of the three dimensional scan data and a non-transitory computer-readable storage medium having stored thereon program instructions of the automated method for tooth segmentation of the three dimensional scan data using the tooth boundary curve.

2. Description of the Related Art

For diagnosis, analysis, and prosthesis production in dentistry, a technology for tooth segmentation from a patient's three dimensional scan data may be required. In particular, digital orthodontic treatment using an oral scanner is increasing in the dental field. In orthodontics, it is important to predict the arrangement and occlusion of teeth and establish an appropriate plan. For this, the tooth segmentation is essential.

A conventional method for the tooth segmentation is as follows. First, a dental scan data is obtained using the oral scanner. Then, an operator manually designates a tooth boundary, and designates a plane to be used for the tooth segmentation using axis information and the tooth boundary and checks segmented surfaces between the teeth and corrects portions if necessary. This process may be repeatedly performed for all teeth to obtain tooth segmentation data.

As explained above, when the operator manually designates the tooth boundary with eyes through a two dimensional screen for the three dimensional data, an accuracy may be decreased, a high skill and a lot of time may be required for the operator.

Conventional tooth segmentation techniques mainly use a method of masking a surface corresponding to teeth. In the conventional method, a problem in which some areas of the tooth are not masked (FIGS. 1, 2 and 3), a problem in which a mask is not formed within one tooth and invades an adjacent tooth or a gum (FIGS. 4 and 5) and a problem in which a mask determines a plurality of teeth as one tooth (FIG. 6) may occur.

For example, referring to an arrow portion of FIG. 1, it can be seen that an upper area of the tooth is not masked. Referring to an arrow portion of FIG. 2, it can be seen that a portion of an upper area of the tooth is not masked so that a hole is formed. Referring to an arrow portion of FIG. 3, it can be seen that a boundary area of teeth is not masked well. Referring to a dotted elliptical portion of FIG. 4, it can be seen that a mask invades an adjacent tooth. Referring to a dotted elliptical portion of FIG. 5, it can be seen that a mask invades a gum portion. Referring to an arrow portion of FIG. 6, it can be seen that two teeth are determined as one tooth by a mask and the mask invades a gum portion.

In addition, conventional tooth segmentation methods may be limited for separating all teeth due to algorithm limitations. In actual clinical practice, a scan data for partial teeth rather than entire teeth are often used, and it may be difficult to separate teeth from the scan data for partial teeth in the conventional tooth segmentation methods. In addition, in order to separate teeth from the scan data for partial teeth using a deep learning, a model learned for the partial teeth data may be additionally required, and accordingly, excessive memory usage and excessive speed reduction may occur.

SUMMARY

Embodiments provide an automated method for tooth segmentation of a three dimensional scan data performed through an artificial intelligence neural network for tooth detection, a mesh parameterization, and an artificial intelligence neural network for tooth boundary generation.

Embodiments provide a non-transitory computer-readable storage medium having stored thereon program instructions of the automated method for tooth segmentation of the three dimensional scan data.

In an example automated method for tooth segmentation of a three dimensional scan data according to the present inventive concept, the method includes detecting a tooth of the scan data using a first artificial intelligence neural network, extracting a tooth scan data from the scan data based on a result of a tooth detection, generating a tooth mapped data corresponding to a predetermined space based on the tooth scan data, generating the tooth boundary curve by inputting the tooth mapped data to a second artificial intelligence neural network and mapping the tooth boundary curve to the scan data.

In an embodiment, the method may further include converting the scan data to a two dimensional image. The two dimensional image may be inputted to the first artificial intelligence neural network.

In an embodiment, the detecting the tooth of the scan data may include inputting the two dimensional image to the first artificial intelligence neural network, outputting an output two dimensional image including two dimensional tooth detection information by the first artificial intelligence neural network and converting the two dimensional tooth detection information to three dimensional tooth detection information.

In an embodiment, the detecting the tooth of the scan data may include generating a tooth bounding box surrounding the tooth.

In an embodiment, the extracting the tooth scan data may include extracting the tooth scan data corresponding to the tooth using a tooth cutting box corresponding to the tooth bounding box.

In an embodiment, the tooth cutting box may include the tooth bounding box and a size of the tooth cutting box may be greater than a size of the tooth bounding box.

In an embodiment, the detecting the tooth of the scan data may include generating a tooth landmark by mapping a center point of the tooth bounding box to a tooth surface.

In an embodiment, the extracting the tooth scan data may include extracting the tooth scan data corresponding to the tooth using a tooth cutting area generated based on the tooth landmark.

In an embodiment, the method may further include converting the tooth scan data to a curvature data representing curvature values of points in the tooth scan data.

In an embodiment, the curvature data may represent minimum curvature values of the points in the tooth scan data.

In an embodiment, the method may further include inverting grayscales of the curvature data such that an inverted curvature data has a white portion when the minimum curvature value of the point is high and a black portion when the minimum curvature value of the points is low.

In an embodiment, the generating the tooth mapped data may include mapping the curvature data of the tooth scan data to the predetermined space to generate the tooth mapped data.

In an embodiment, inputs of the second artificial intelligence neural network may be the tooth mapped data and the tooth bounding box. An output of the second artificial intelligence neural network may be the tooth boundary curve.

In an embodiment, the generating the tooth boundary curve may include rotating the tooth bounding box to generate a diamond contour.

In an embodiment, the generating the tooth boundary curve may further include displacing a position of a vertex of the diamond contour in the tooth mapped data to generate an extreme point.

In an embodiment, the generating the tooth boundary curve may further include generating an octagon contour passing through the extreme points based on the extreme points.

In an embodiment, the generating the tooth boundary curve may further include displacing the octagon contour in the tooth mapped data according to the curvature value to generate the tooth boundary curve.

In an embodiment, the first artificial intelligence neural network may be configured to receive the three dimensional scan data and to output three dimensional tooth detection information.

In an example non-transitory computer-readable storage medium having stored thereon program instructions, the program instructions is executable by at least one hardware processor to detect a tooth of a three dimensional scan data using a first artificial intelligence neural network, extract a tooth scan data from the scan data based on a result of a tooth detection, generate a tooth mapped data corresponding to a predetermined space based on the tooth scan data, generate a tooth boundary curve by inputting the tooth mapped data to a second artificial intelligence neural network and map the tooth boundary curve to the scan data.

According to the automated method for tooth segmentation of a three dimensional scan data using the tooth boundary, the method for tooth segmentation may be automatically performed through an artificial intelligence neural network for tooth detection, a mesh parameterization, and an artificial intelligence neural network for tooth boundary generation so that the time and the effort for the tooth segmentation from the scan data may be reduced.

The tooth boundary curve may be accurately generated rather than a tooth surface using the artificial intelligence neural network for tooth detection, the mesh parameterization, and the artificial intelligence neural network for tooth boundary generation. Thus, the problem in which some areas of the tooth are not masked, the problem in which a mask is not formed within one tooth and invades an adjacent tooth or a gum and a problem in which a mask determines a plurality of teeth as one tooth may be prevented. Therefore, the accuracy of the tooth segmentation may be enhanced.

In addition, the artificial intelligence neural network for tooth boundary generation may transform an initially input contour data to generate the tooth boundary curve for distinguishing teeth and gums at once. Thus, the accuracy of the tooth segmentation may be enhanced.

In addition, even if a scan data for partial teeth rather than entire teeth is input, the area of each tooth may be accurately determined using the artificial intelligence neural network for tooth detection and the boundary curve for each scan data corresponding to each tooth may be generated. Thus, the tooth segmentation may be performed using the same model regardless of whether the scan data represents entire teeth or partial teeth.

BRIEF DESCRIPTION OF THE DRAWINGS

The above and other features and advantages of the present inventive concept will become more apparent by describing in detailed embodiments thereof with reference to the accompanying drawings, in which:

FIG. 9 is a diagram illustrating an operation of a tooth detection of FIG. 7;

DETAILED DESCRIPTION OF THE EMBODIMENTS

Figure 1:
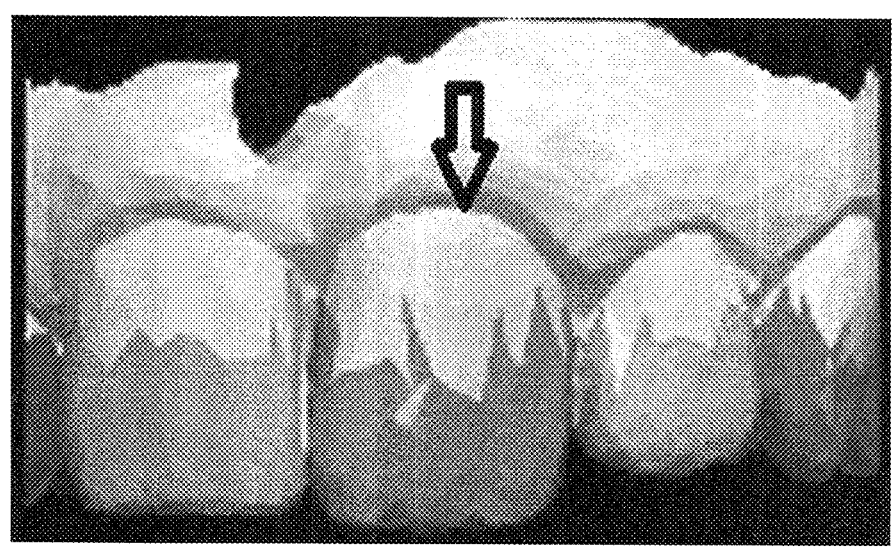
FIG. 1 is a diagram illustrating an example of a tooth segmentation error in a conventional automatic tooth segmentation of a three dimensional scan data.
Figure 2:
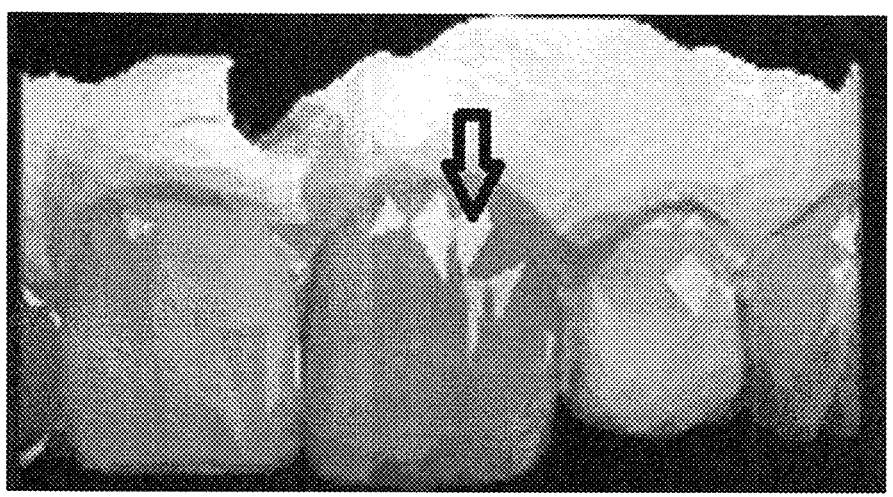
FIG. 2 is a diagram illustrating an example of a tooth segmentation error in a conventional automatic tooth segmentation of a three dimensional scan data.
Figure 3:
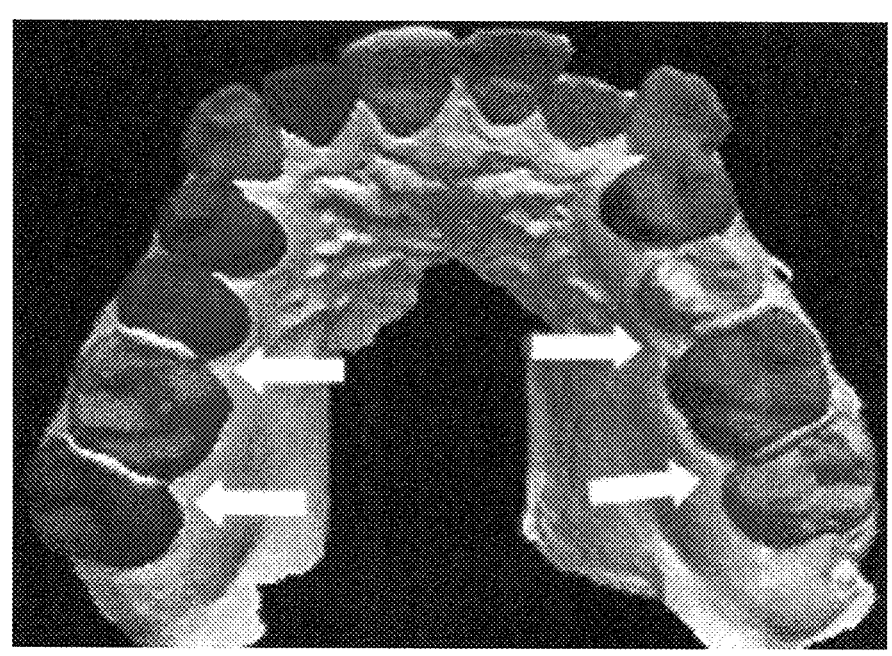
FIG. 3 is a diagram illustrating an example of a tooth segmentation error in a conventional automatic tooth segmentation of a three dimensional scan data.
Figure 4:
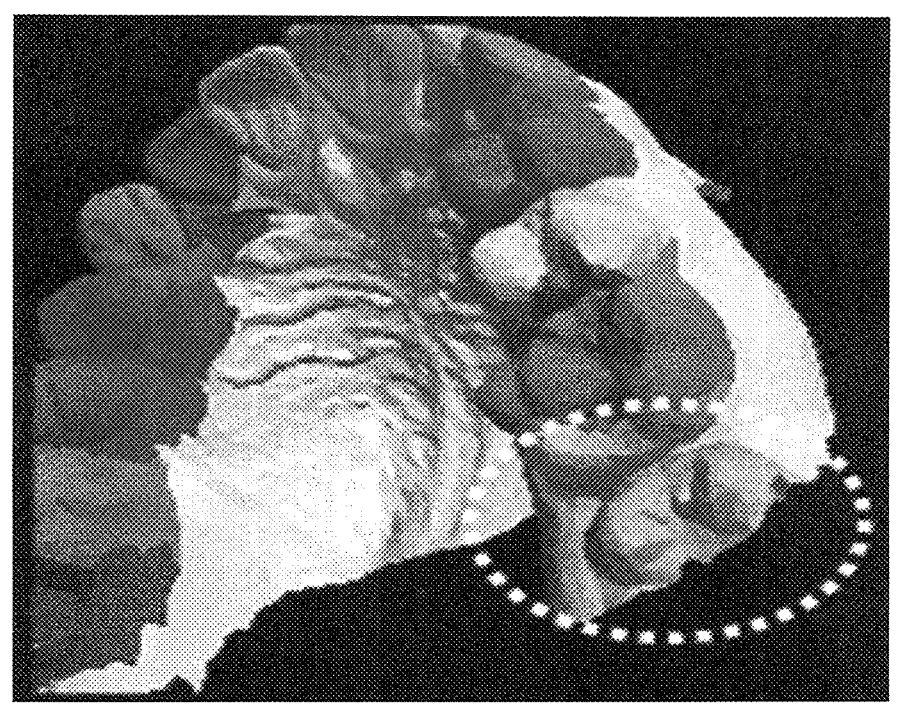
FIG. 4 is a diagram illustrating an example of a tooth segmentation error in a conventional automatic tooth segmentation of a three dimensional scan data.
Figure 5:
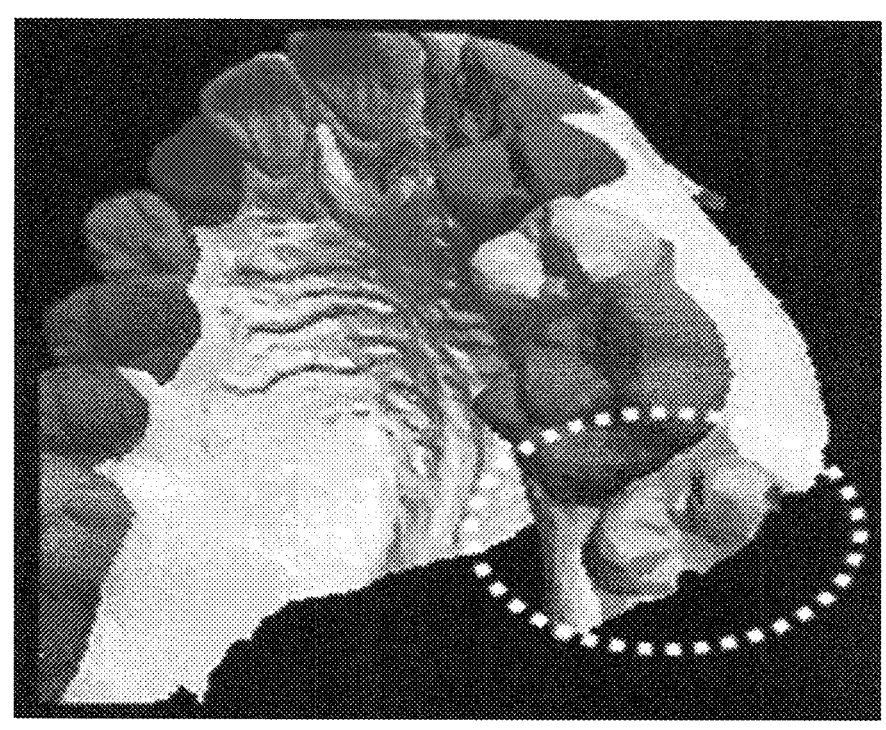
FIG. 5 is a diagram illustrating an example of a tooth segmentation error in a conventional automatic tooth segmentation of a three dimensional scan data.
Figure 6:
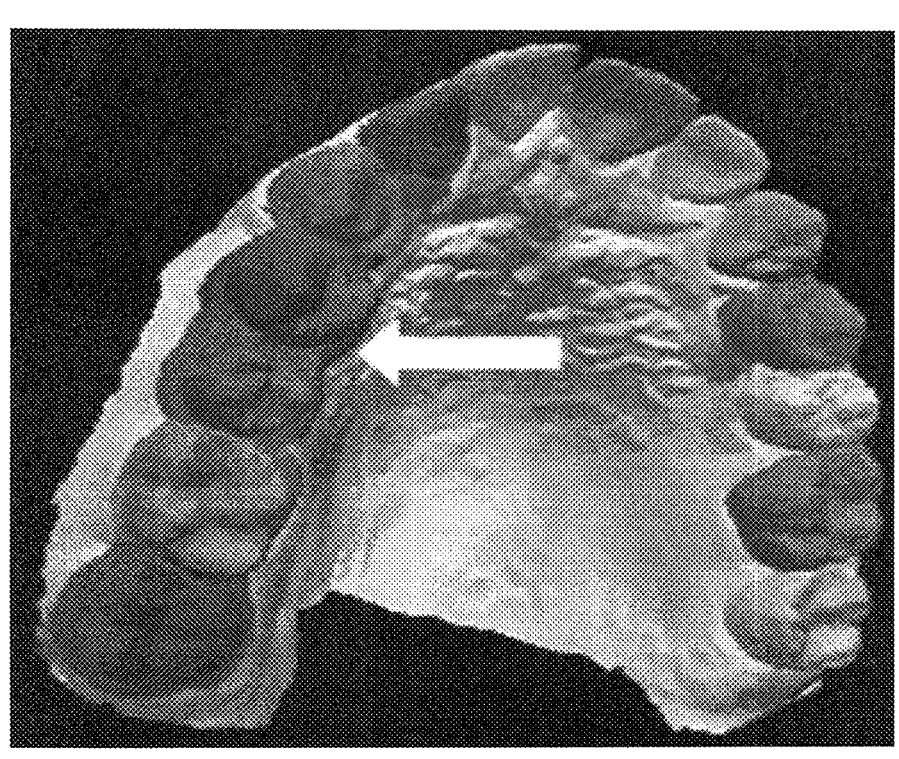
FIG. 6 is a diagram illustrating an example of a tooth segmentation error in a conventional automatic tooth segmentation of a three dimensional scan data.

The present inventive concept now will be described more fully hereinafter with reference to the accompanying drawings, in which embodiments of the present invention are shown. The present inventive concept may, however, be embodied in many different forms and should not be construed as limited to the embodiments set forth herein.

Rather, these embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

Figure 7:
FIG. 7 is a brief flowchart diagram illustrating an automated method for tooth segmentation of a three dimensional scan data using a boundary curve according to an embodiment of the present inventive concept.
Figure 8:
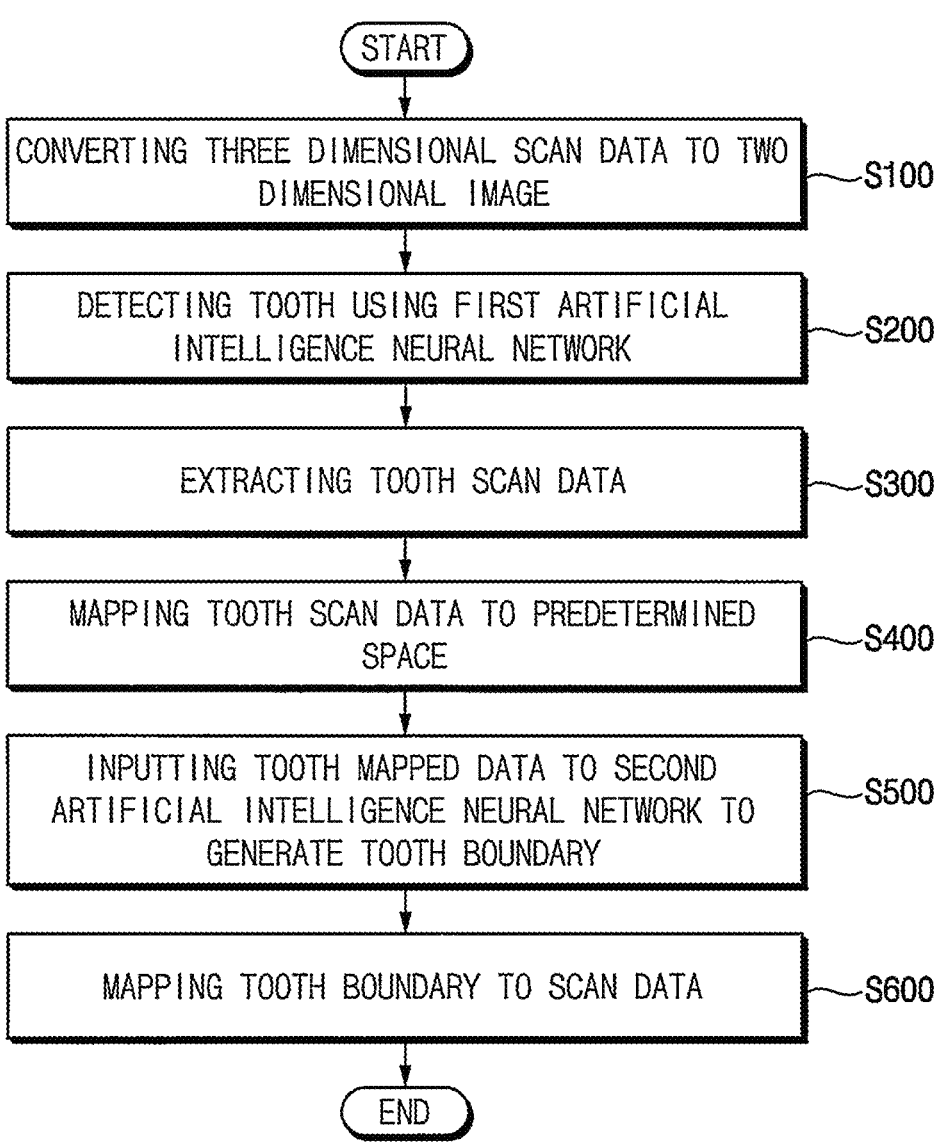
FIG. 8 is a detailed flowchart diagram illustrating the automated method for tooth segmentation of FIG. 7.

FIG. 7 is a brief flowchart diagram illustrating an automated method for tooth segmentation of a three dimensional scan data using a boundary curve according to an embodiment of the present inventive concept. FIG. 8 is a detailed flowchart diagram illustrating the automated method for tooth segmentation of FIG. 7.

Referring to FIGS. 7 and 8, in the present inventive concept, individual teeth may be fully automatically segmented from the three dimensional scan data using a mesh parameterization and a deep learning. For example, the scan data may include polygon meshes so that the scan data may be referred to as "mesh" hereinafter.

The automated method for tooth segmentation of the three dimensional scan data according to the present embodiment may fully automatically segment the individual teeth from the scan data using a first artificial intelligence neural network AI1 for tooth detection, the mesh parameterization and a second artificial intelligence neural network AI2 for tooth boundary generation.

The automated method for tooth segmentation of the three dimensional scan data according to the present embodiment may include an operation of a tooth detection in which the teeth are detected from an image of a three dimensional oral scan data, an operation of parameterizing meshes of an area including the detected teeth in the operation of the tooth detection and an operation of a boundary generation in which a boundary curve of the scan data is generated from the parameterized image.

Generally, a deep learning network may only receive a data having a fixed size (a structured data). The scan data may be represented as three-dimensional polygon meshes and the number of points, edges, and cells of the meshes may be different according to data. Thus, a process converting the scan data into the structured data may be necessary to improve the accuracy of the deep learning network receiving the scan data as an input. In the present inventive concept, the mesh parameterization may be used to convert the scan data in to the structured data.

The mesh parameterization may mean one-to-one mapping of points included in the three dimensional mesh to a predetermined space. To map the space where the mesh exists to the other predetermined space (a parameter space), the boundary of the space where the mesh exists may be mapped into a boundary of the parameter space at first. Internal points in the boundary of the space where the mesh exists may be mapped into an inside of the boundary of the parameter space. When the internal points in the boundary of the space where the mesh exists are mapped into the inside of the boundary of the parameter space, the topology of the mesh may be maximally maintained using an energy function.

When the mesh parameterization is used, the scan data may be mapped into a two dimensional space so that the structured data used for the deep learning may be properly generated.

Using the mesh parameterization, the accuracy of the deep learning network of the second artificial intelligence neural network AI2 generating the tooth boundary curve may be enhanced.

As shown in FIG. 8, the automated method for the tooth segmentation of the three dimensional scan data using the tooth boundary curve according to the present embodiment may include detecting a tooth of the scan data using a first artificial intelligence neural network (operation S200), extracting a tooth scan data from the scan data based on a result of the tooth detection (operation S300), generating a tooth mapped data corresponding to a predetermined space based on the tooth scan data (operation S400), inputting the tooth mapped data to a second artificial intelligence neural network to generate a tooth boundary curve (operation S500) and mapping the tooth boundary curve to the scan data (operation S600).

For example, the automated method for the tooth segmentation of the three dimensional scan data using the tooth boundary curve may further include converting the three dimensional scan data to a two dimensional image (operation S100).

The automated method for the tooth segmentation of the three dimensional scan data according to the present embodiment may be operated by a computing apparatus.

Figure 9:
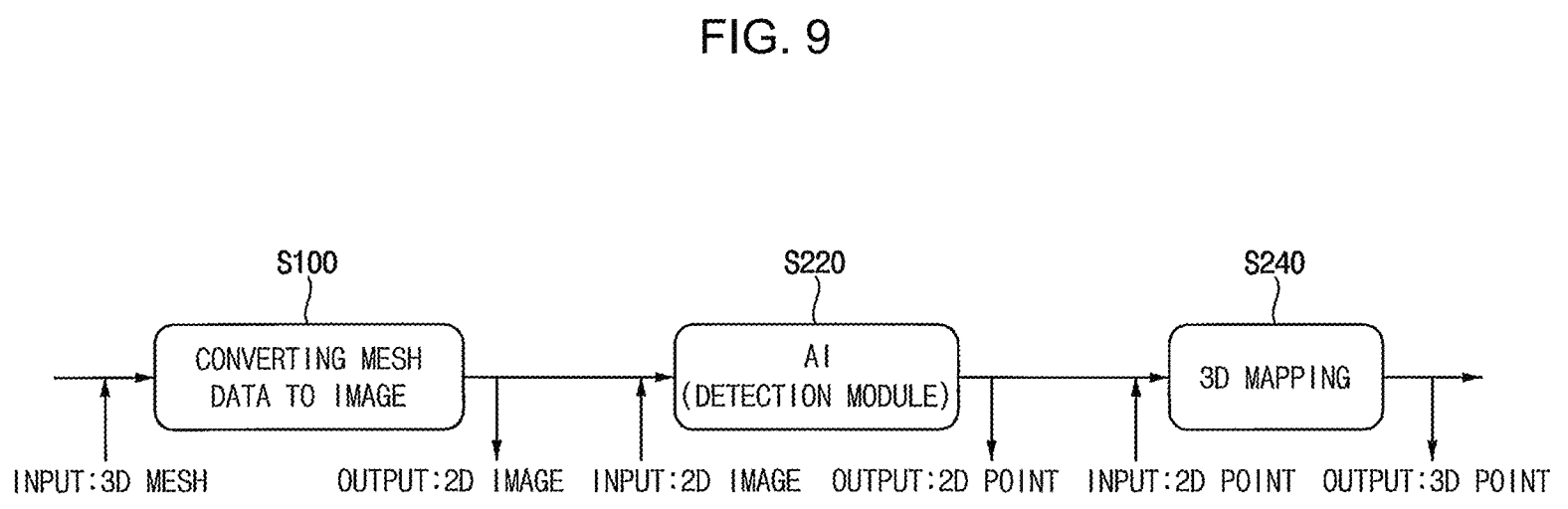
Figure 10:
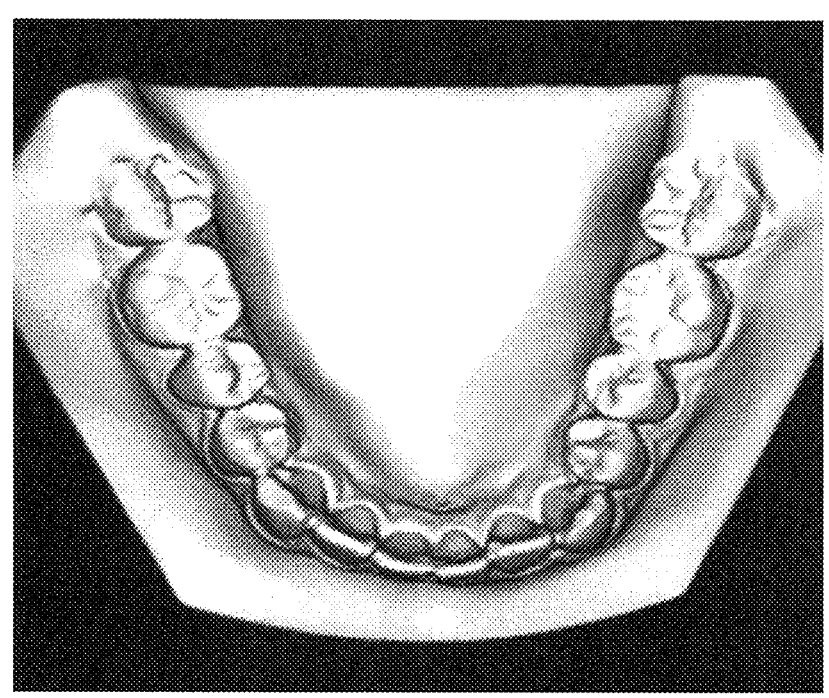
FIG. 10 is a diagram illustrating an example of an input of an operation of converting a mesh data to an image.
Figure 11:
FIG. 11 is a diagram illustrating an example of an output of an operation of converting a mesh data to an image.
Figure 12:
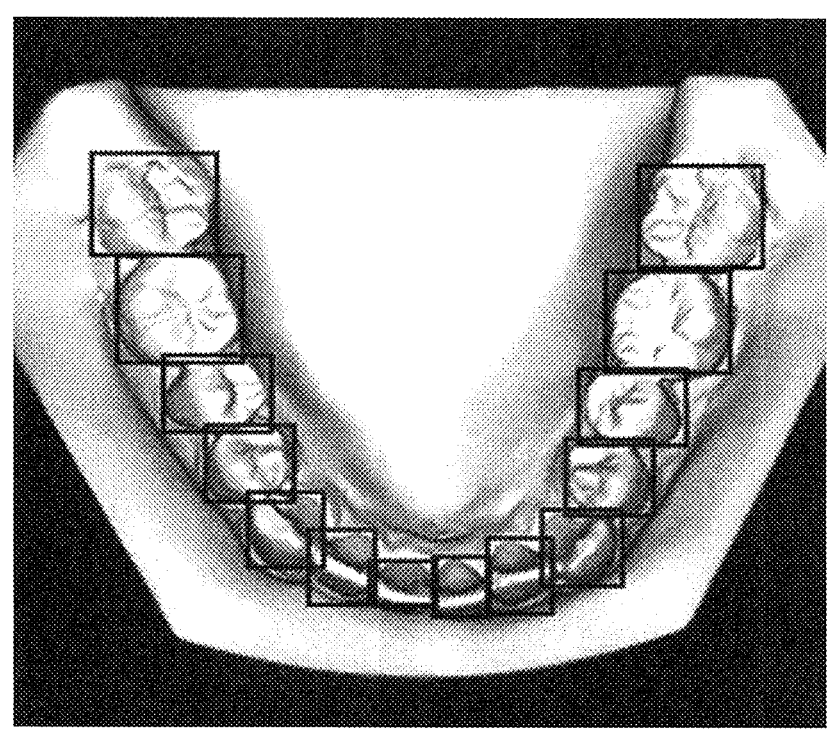
FIG. 12 is a diagram illustrating an example of an output of a first artificial intelligence neural network of FIG. 9.
Figure 13:
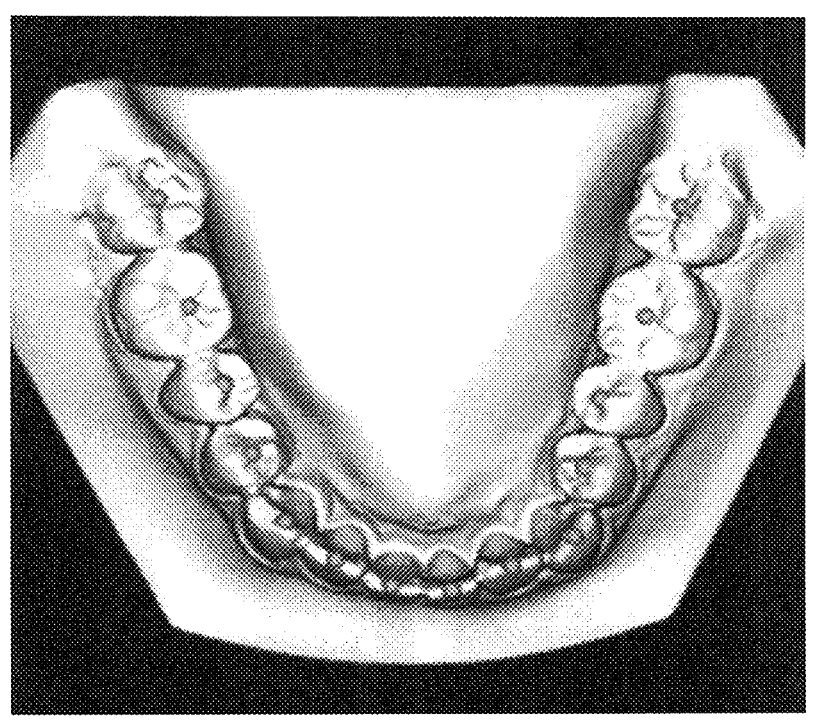
FIG. 13 is a diagram illustrating an example of an output of a first artificial intelligence neural network of FIG. 9.

FIG. 9 is a diagram illustrating an operation of a tooth detection of FIG. 7. FIG. 10 is a diagram illustrating an example of an input of an operation of converting a mesh data to an image. FIG. 11 is a diagram illustrating an example of an output of an operation of converting a mesh data to an image (operation S100). FIG. 12 is a diagram illustrating an example of an output of a first artificial intelligence neural network AI1 of FIG. 9. FIG. 13 is a diagram illustrating an example of an output of a first artificial intelligence neural network AI1 of FIG. 9.

Referring to FIGS. 7 to 13, the tooth detection operation may include converting the scan data to the two dimensional image (operation S100). The converting the scan data to the two dimensional image may be referred to as a mesh imaging operation.

In the present embodiment, the input of the first artificial intelligence neural network AI1 may be a two dimensional image so that the tooth detection operation may include converting the three dimensional scan data to the two dimensional image.

For example, the two dimensional image may be a RGB grayscale data including a red grayscale value, a green grayscale value and a blue grayscale value. For example, the two dimensional image may be a black and white grayscale data. For example, the two dimensional image may be a depth map including depth information. The depth map may be generated based on one of a maximum value, a minimum value, a standard deviation and an average of the three dimensional scan data within two dimensional coordinates.

The operation of converting the scan data to the two dimensional image may include a principal axis normalization operation. The principal axis normalization operation may set a spatial orientation by a principal axis analysis. In the principal axis normalization operation, a first principal axis, a second principal axis and a third principal axis which are perpendicular to each other may be determined by analyzing the principal axes formed by the points in the scan data.

A longest axis among the first principal axis, the second principal axis and the third principal axis extracted through the principal axis analysis may be determined to a left-and-right direction of a U-shape of teeth. A shortest axis among the first principal axis, the second principal axis and the third principal axis may be determined to an up-and-down direction of the U-shape. A second longest axis among the first principal axis, the second principal axis and the third principal axis may be determined to a front-and-back direction of the U-shape.

The scan data may be aligned such that an occlusal plane of the teeth may be clearly seen through the principal axis normalization operation.

The operation of detecting the tooth using the first intelligence neural network AI1 may include receiving the input two dimensional image and outputting the output two dimensional image including two dimensional tooth detection information (operation S220) and converting the two dimensional tooth detection information to three dimensional tooth detection information (operation S240).

Herein, the tooth detection information may be a tooth bounding box. Herein, the tooth detection information may be a center point of a tooth surface.

For example, the first artificial intelligence neural network AI1 may receive the two dimensional image and generate a two dimensional bounding box (2D point) (operation S220). The two dimensional bounding box (2D point) may be converted to the three dimensional bounding box (3D point) (operation S240). An example of the three dimensional bounding box (3D point) is illustrated in FIG. 12.

Alternatively, the first artificial intelligence neural network AI1 may receive the two dimensional image and generate a two dimensional tooth landmark (2D point) (operation S220). The two dimensional tooth landmark (2D point) may be converted to the three dimensional tooth landmark (3D point) (operation S240). An example of the three dimensional tooth landmark (3D point) is illustrated in FIG. 13.

As explained above, the tooth landmark may be automatically generated through the first artificial intelligence neural network AI1. Alternatively, the tooth landmark may be generated using the bounding box automatically generated through the first artificial intelligence neural network AI1. For example, a center point of the tooth bounding box may be mapped to a tooth surface to generate the tooth landmark.

When the scan data includes fourteen teeth, fourteen bounding boxes may be generated through the first artificial intelligence neural network AI1. A size of the bounding box may vary according to the tooth. Similarly, when the scan data includes fourteen teeth, fourteen landmarks may be generated through the first artificial intelligence neural network AI1.

Figure 14:
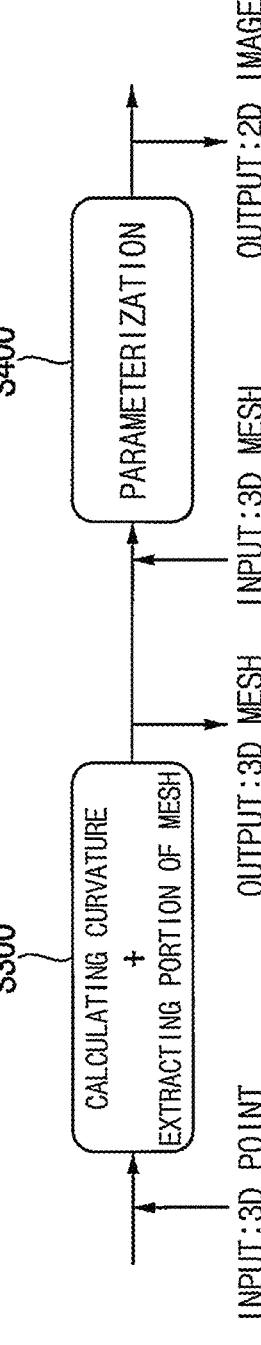
FIG. 14 is a diagram illustrating an operation of a parameterization of FIG. 7.
Figure 15:
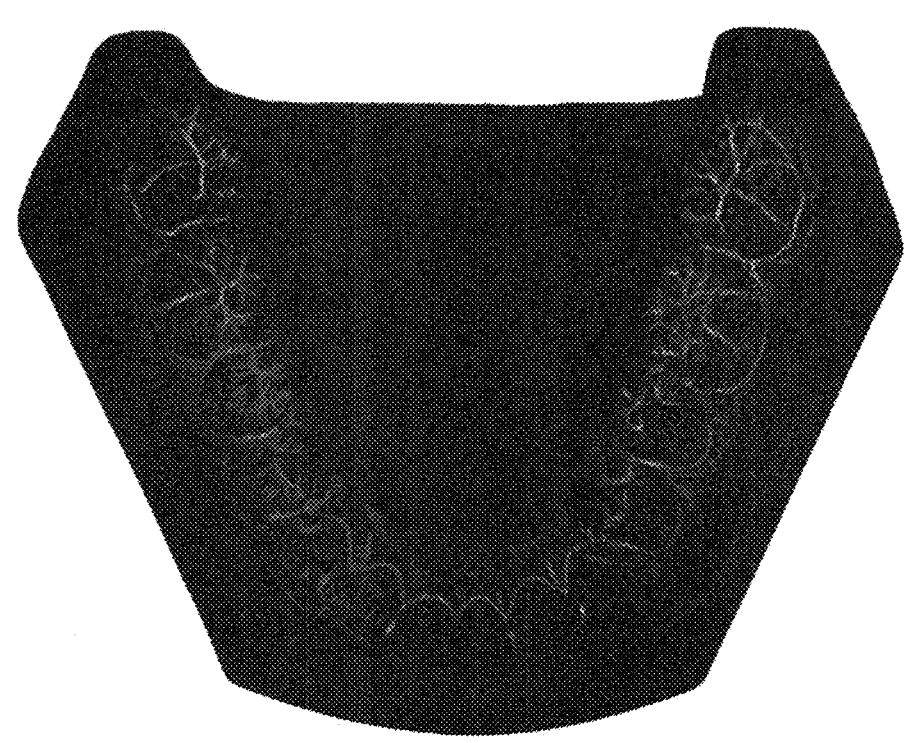
FIG. 15 is a diagram illustrating a curvature data used in the operation of the parameterization of FIG. 7.
Figure 16:
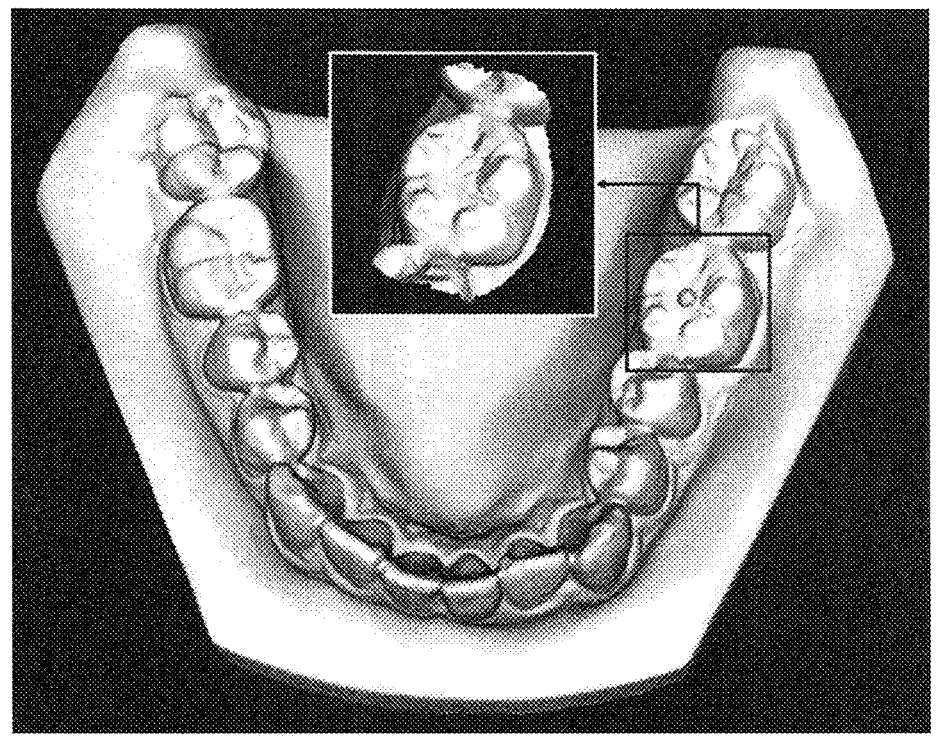
FIG. 16 is a diagram illustrating a tooth scan data generated by extracting a portion of a mesh data of FIG. 14.
Figure 17:
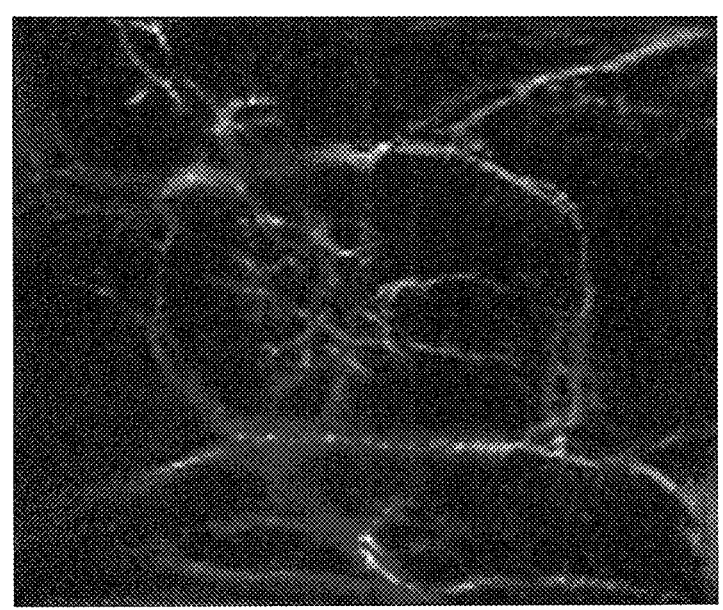
FIG. 17 is a diagram illustrating a tooth mapped data generated by parameterizing the curvature data of the tooth scan data of FIG. 14.

FIG. 14 is a diagram illustrating an operation of a parameterization of FIG. 7. FIG. 15 is a diagram illustrating a curvature data used in the operation of the parameterization of FIG. 7. FIG. 16 is a diagram illustrating a tooth scan data generated by extracting a portion of a mesh data of FIG. 14. FIG. 17 is a diagram illustrating a tooth mapped data generated by parameterizing the curvature data of the tooth scan data of FIG. 14.

Referring to FIGS. 7 to 14, the operation of the parameterization may include extracting tooth scan data from the scan data based on the result of the tooth detection (operation S300) and generating the tooth mapped data corresponding to the predetermined space based on the tooth scan data (operation S400).

For example, when the tooth bounding box is generated surrounding each tooth in the tooth detection operation, the tooth scan data may be extracted corresponding to each tooth using a tooth cutting box in the operation S300 of extracting tooth scan data. Herein, the tooth cutting box may include the tooth bounding box and a size of the tooth cutting box may be greater than a size of the tooth bounding box. As shown in FIG. 16, the size of the tooth cutting box may be greater than the size of the tooth bounding box. The tooth bounding box is an area which tightly corresponds to a boundary of the tooth for detecting the tooth. The tooth cutting box is an area for generating the tooth boundary curve after cutting the scan data in a unit of a tooth. Thus, the tooth cutting box does not necessarily coincide with the tooth bounding box, and it may be preferable to set the tooth cutting box slightly larger than the tooth bounding box while including the tooth bounding box.

For example, when the tooth landmark representing the center point of the tooth surface is generated in the tooth detection operation, the tooth scan data may be extracted corresponding to each tooth using a tooth cutting area generated based on the tooth landmark in the operation S300 of extracting tooth scan data. For example, the tooth cutting area may be a spherical area having the tooth landmark as a center.

The operation of the parameterization may include converting the tooth scan data to a curvature data representing curvature values of points in the tooth scan data.

FIG. 15 illustrates the curvature data representing the curvature values of the points in the tooth scan data. For example, the curvature data may represent maximum curvature values, minimum curvature values, Gaussian curvature values or average curvature values. In FIG. 15, the curvature data represents the minimum curvature values.

The curvature value of an upper surface of the tooth may be relatively constant. However, the curvature value may vary greatly at a boundary between the teeth. Thus, the curvature value may well represent the boundary between the teeth and a boundary between the tooth and a gum. When the tooth boundary curve is generated using the curvature value, the accuracy of the tooth segmentation may be relatively high.

Generally, the curvature data may have a black portion when the curvature value is high and a white portion when the curvature value is low.

However, in the present embodiment, grayscales of the curvature data may be inverted such that the inverted curvature data may have a white portion when the minimum curvature value is high and a black portion when the minimum curvature value is low. FIG. 15 represents the inverted curvature data having the inverted grayscales. Thus, a portion having a high minimum curvature value is represented in white and a portion having a low minimum curvature value is represented in black. For example, when the grayscales of the curvature data are not inverted, a portion having a high minimum curvature value may be represented in black and a portion having a low minimum curvature value may be represented in black contrary to FIG. 15.

When the grayscales of the curvature data are not inverted, a significant portion (having a high minimum curvature value) such as the boundary between the tooth and a gum may be represented in black. However, in the present embodiment, the significant portion (having the high minimum curvature value) such as the boundary between the tooth and the gum may be represented in white due to the inversion of the grayscales of the curvature data.

For example, when there is a hole in the scan data and the point does not exist corresponding to the hole and accordingly a curvature value does not exist corresponding to the hole, a portion where the curvature value does not exist may be represented in black in the conventional curvature data. When the grayscales of the curvature data are not inverted, the significant portion (such as the boundary between the tooth and the gum) may also be represented in black. Thus, both the portion where the curvature value does not exist and the significant portion are represented in black so that the portion where the curvature value may be mistaken as the significant portion. In contrast, when the grayscales of the curvature data are inverted, the significant portion (such as the boundary between the tooth and the gum) may be represented in white. Thus, the portion where the curvature value may not be mistaken as the significant portion so that the portion where the curvature value may not be determined as the significant portion.

In the operation S400 of generating the tooth mapped data, the curvature data of the tooth scan data corresponding to each tooth may be mapped to the predetermined space so that the tooth mapped data may be generated. FIG. 17 illustrates an example of the tooth mapped data. The tooth mapped data may be a result of mapping the curvature data of the tooth scan data corresponding to the tooth to a predetermined space to convert to two dimensional data.

For example, the predetermined space may have a square shape. The tooth bounding box and the tooth cutting box have varied shapes and sizes according to teeth, the tooth scan data may have varied shapes and sizes according to teeth. In contrast, the shape and the size of the predetermined space may be set constant regardless of teeth. In this case, the shape and the size of the tooth mapped data may be constant regardless of teeth.

The tooth mapped data is an input of the second artificial intelligence neural network AI2 so that it may be desirable to set the size of the tooth mapped data constantly.

Figure 18:
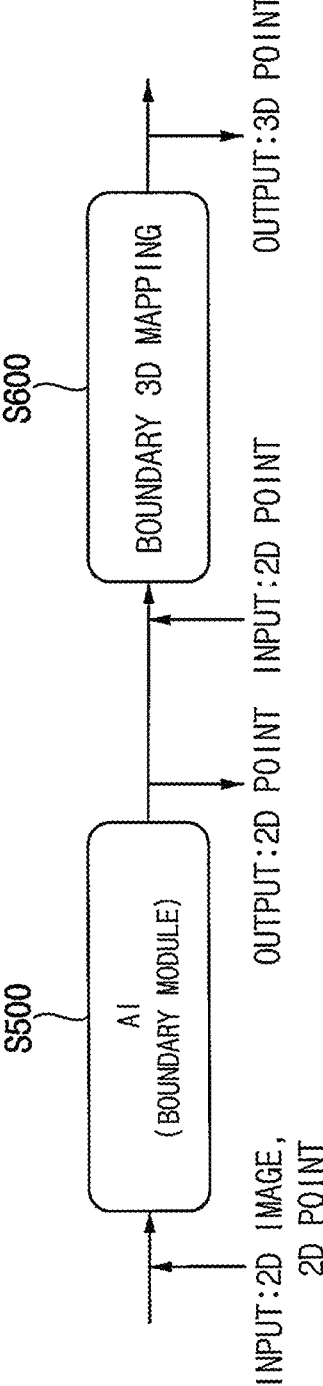
FIG. 18 is a diagram illustrating an operation of boundary generating of FIG. 7.
Figure 19:
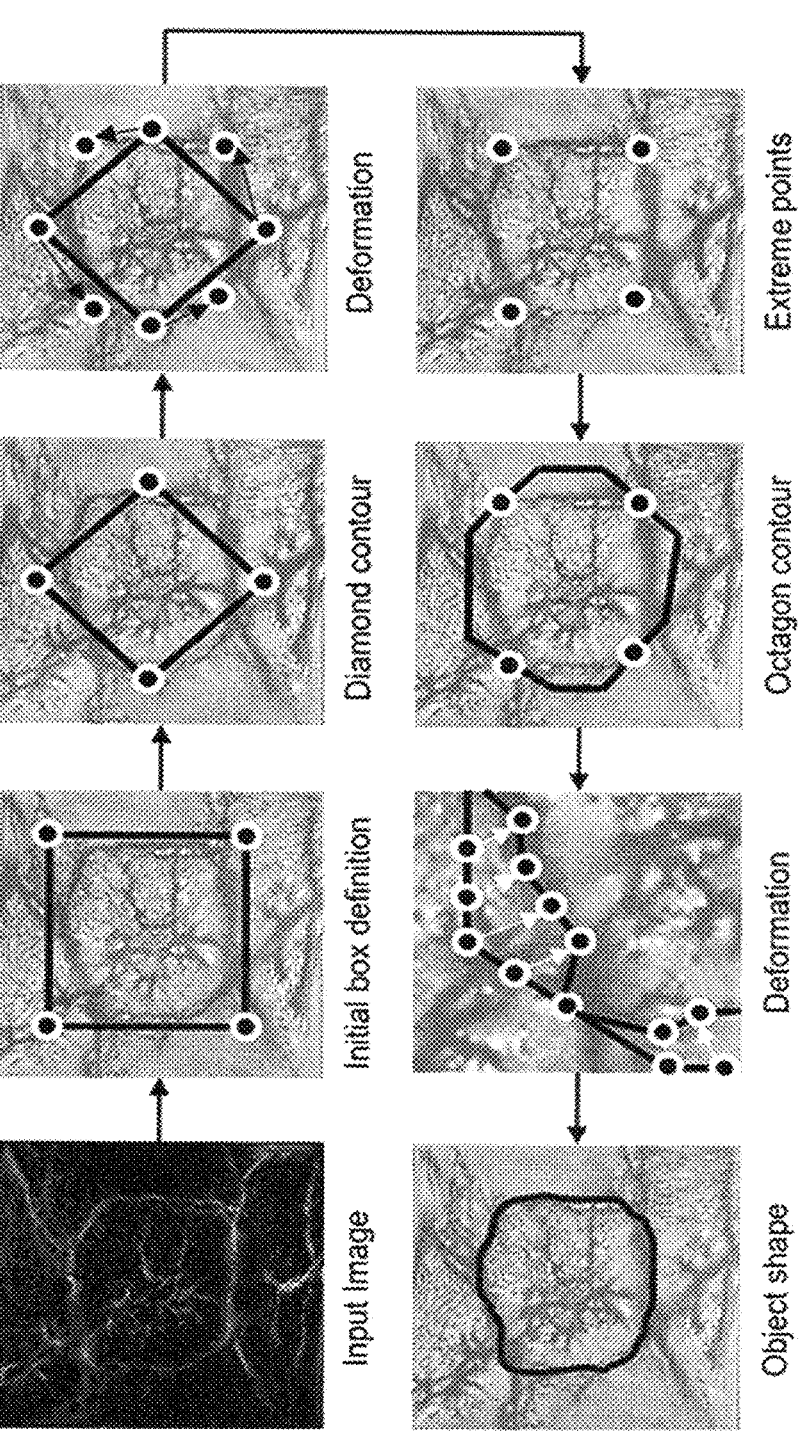
FIG. 19 is a diagram illustrating an operation of a second artificial intelligence neural network of FIG. 18 in detail.
Figure 20:
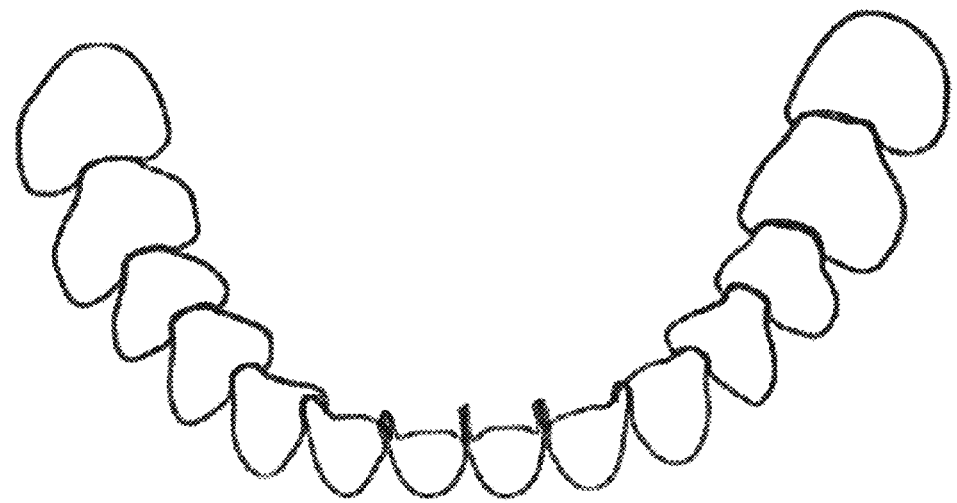
FIG. 20 is a final result of tooth segmentation generated by the boundary 3D mapping of FIG. 18.

FIG. 18 is a diagram illustrating an operation of boundary generating of FIG. 7. FIG. 19 is a diagram illustrating an operation of a second artificial intelligence neural network of FIG. 18 in detail. FIG. 20 is a final result of tooth segmentation generated by the boundary 3D mapping of FIG. 18.

Referring to FIGS. 7 to 20, inputs of the second artificial intelligence neural network AI2 may be the tooth mapped data and the tooth bounding box and an output of the second artificial intelligence neural network AI2 may be the tooth boundary curve.

Herein, the tooth bounding box may be used as initial contour information (Initial box definition in FIG. 19) in the second artificial intelligence neural network AI2.

For example, the operation S500 of generating the tooth boundary curve may include rotating the tooth bounding box to generate a diamond contour. For example, the tooth bounding box may be rotated by 45 degrees to generate the diamond contour.

For example, the operation S500 of generating the tooth boundary curve may further include displacing (Deformation) a position of a vertex of the diamond contour in the tooth mapped data to generate an extreme point. The extreme point may be generated in a position where the curvature value is relatively little or relatively great in the tooth mapped data.

For example, the operation S500 of generating the tooth boundary curve may further include generating an octagon contour passing through the extreme points based on the extreme points.

For example, the operation S500 of generating the tooth boundary curve may further include displacing (Deformation) the octagon contour in the tooth mapped data according to the curvature value to generate the tooth boundary curve (Object shape).

The tooth boundary curve which is the output of the second artificial intelligence neural network AI2 may be three dimensionally mapped to the scan data to complete the tooth segmentation (operation S600). FIG. 20 illustrates an example of the final tooth segmentation result.

According to the present embodiment, the method for tooth segmentation may be automatically performed through the artificial intelligence neural network AI1 for the tooth detection, the mesh parameterization, and the artificial intelligence neural network AI2 for tooth boundary generation so that the time and the effort for the tooth segmentation from the scan data may be reduced.

The tooth boundary curve may be accurately generated rather than a tooth surface using the artificial intelligence neural network AI1 for tooth detection, the mesh parameterization, and the artificial intelligence neural network AI2 for tooth boundary generation. Thus, the problem in which some areas of the tooth are not masked, the problem in which a mask is not formed within one tooth and invades an adjacent tooth or a gum and a problem in which a mask determines a plurality of teeth as one tooth may be prevented. Therefore, the accuracy of the tooth segmentation may be enhanced.

In addition, the artificial intelligence neural network AI2 for tooth boundary generation may transform an initially input contour data to generate the tooth boundary curve for distinguishing teeth and gums at once. Thus, the accuracy of the tooth segmentation may be enhanced.

In addition, even if a scan data for partial teeth rather than entire teeth is input, the area of each tooth may be accurately determined using the artificial intelligence neural network AI1 for tooth detection, and the boundary curve for each scan data corresponding to each tooth may be generated. Thus, the tooth segmentation may be performed using the same model regardless of whether the scan data represents entire teeth or partial teeth.

Figure 21:
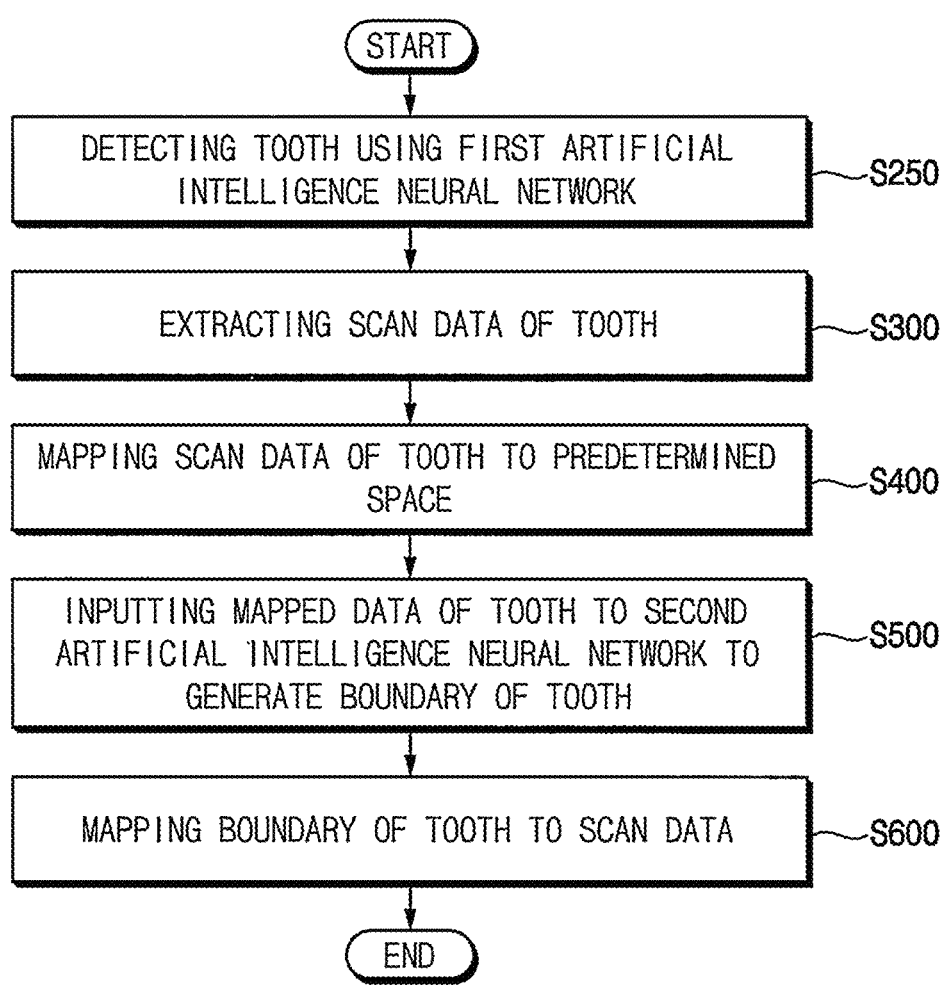
FIG. 21 is a detailed flowchart diagram illustrating an automated method for tooth segmentation of a three dimensional scan data using a boundary curve according to an embodiment of the present inventive concept.

FIG. 21 is a detailed flowchart diagram illustrating an automated method for tooth segmentation of a three dimensional scan data using a boundary curve according to an embodiment of the present inventive concept.

The automated method for tooth segmentation of the three dimensional scan data according to the present embodiment is substantially the same as the automated method for tooth segmentation of the three dimensional scan data of the previous embodiment explained referring to FIGS. 1 to 20 except for the input of the first artificial intelligence neural network. Thus, the same reference numerals will be used to refer to the same or like parts as those described in the previous embodiment of FIGS. 1 to 20 and any repetitive explanation concerning the above elements will be omitted.

Referring to FIG. 21, the automated method for the tooth segmentation of the three dimensional scan data using the tooth boundary curve according to the present embodiment may include detecting a tooth of the scan data using a first artificial intelligence neural network (operation S250), extracting a tooth scan data from the scan data based on a result of the tooth detection (operation S300), generating a tooth mapped data corresponding to a predetermined space based on the tooth scan data (operation S400), inputting the tooth mapped data to a second artificial intelligence neural network to generate a tooth boundary curve (operation S500) and mapping the tooth boundary curve to the scan data (operation S600).

The automated method for the tooth segmentation of the three dimensional scan data according to the present embodiment may be operated by a computing apparatus.

In the automated method for the tooth segmentation of FIGS. 1 to 20, the input of the first artificial intelligence neural network AI1 may be the two dimensional image. In the automated method for the tooth segmentation of the present embodiment, the input of the first artificial intelligence neural network AI1 may be the three dimensional scan data.

In the present embodiment, the first artificial intelligence neural network AI1 may receive the three dimensional scan data and output a three dimensional tooth detection result. Herein, the tooth detection result may be the tooth bounding box or the tooth landmark.

According to the present embodiment, the method for tooth segmentation may be automatically performed through the artificial intelligence neural network AI1 for the tooth detection, the mesh parameterization, and the artificial intelligence neural network AI2 for tooth boundary generation so that the time and the effort for the tooth segmentation from the scan data may be reduced.

The tooth boundary curve may be accurately generated rather than a tooth surface using the artificial intelligence neural network AI1 for tooth detection, the mesh parameterization, and the artificial intelligence neural network AI2 for tooth boundary generation. Thus, the problem in which some areas of the tooth are not masked, the problem in which a mask is not formed within one tooth and invades an adjacent tooth or a gum and a problem in which a mask determines a plurality of teeth as one tooth may be prevented. Therefore, the accuracy of the tooth segmentation may be enhanced.

In addition, the artificial intelligence neural network AI2 for tooth boundary generation may transform an initially input contour data to generate the tooth boundary curve for distinguishing teeth and gums at once. Thus, the accuracy of the tooth segmentation may be enhanced.

In addition, even if a scan data for partial teeth rather than entire teeth is input, the area of each tooth may be accurately determined using the artificial intelligence neural network AI1 for tooth detection, and the boundary curve for each scan data corresponding to each tooth may be generated. Thus, the tooth segmentation may be performed using the same model regardless of whether the scan data represents entire teeth or partial teeth.

According to an embodiment of the present inventive concept, a non-transitory computer-readable storage medium having stored thereon program instructions of the automated method for tooth segmentation of the three dimensional scan data using the tooth boundary curve may be provided. The above mentioned method may be written as a program executed on the computer. The method may be implemented in a general purpose digital computer which operates the program using a computer-readable medium. In addition, the structure of the data used in the above mentioned method may be written on a computer readable medium through various means. The computer readable medium may include program instructions, data files and data structures alone or in combination. The program instructions written on the medium may be specially designed and configured for the present inventive concept, or may be generally known to a person skilled in the computer software field. For example, the computer readable medium may include a magnetic medium such as a hard disk, a floppy disk and a magnetic tape, an optical recording medium such as CD-ROM and DVD, a magneto-optical medium such as floptic disc and a hardware device specially configured to store and execute the program instructions such as ROM, RAM and a flash memory. For example, the program instructions may include a machine language codes produced by a compiler and high-level language codes which may be executed by a computer using an interpreter or the like. The hardware device may be configured to operate as one or more software modules to perform the operations of the present inventive concept.

In addition, the above mentioned automated method for the tooth segmentation of the three dimensional scan data using the tooth boundary curve may be implemented in a form of a computer-executed computer program or an application which are stored in a storage method.

The present inventive concept is related to the automated method for the tooth segmentation of the three dimensional scan data using the tooth boundary curve and the non-transitory computer-readable storage medium having stored thereon program instructions of the automated method for the tooth segmentation of the three dimensional scan data using the tooth boundary curve. According to the present inventive concept, the time and the effort for the tooth segmentation may be reduced and the accuracy of the tooth segmentation may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. An automated method for tooth segmentation of a three dimensional scan data using a tooth boundary curve, the method comprising:

detecting a tooth in the scan data using a first artificial intelligence neural network;

extracting a tooth scan data from the scan data based on a result of a tooth detection;

converting the tooth scan data to a curvature data representing curvature values of points in the tooth scan data;

inverting grayscales of the curvature data such that an inverted curvature data has a white portion when a minimum curvature value of points is high and a black portion when the minimum curvature value of points is low;

generating a tooth mapped data by mapping the tooth scan data to a predetermined space based on the tooth scan data;

generating the tooth boundary curve by inputting the tooth mapped data to a second artificial intelligence neural network; and mapping the tooth boundary curve to the scan data.

2. The method of claim 1, further comprising converting the scan data to a two dimensional image, wherein the two dimensional image is inputted to the first artificial intelligence neural network.

3. The method of claim 2, wherein the detecting the tooth in the scan data comprises:

inputting the two dimensional image to the first artificial intelligence neural network;

outputting an output two dimensional image including two dimensional tooth detection information by the first artificial intelligence neural network; and converting the two dimensional tooth detection information to three dimensional tooth detection information.

4. The method of claim 1, wherein the detecting the tooth in the scan data comprises:

generating a tooth bounding box surrounding the tooth.

5. The method of claim 4, wherein the extracting the tooth scan data comprises:

extracting the tooth scan data corresponding to the tooth using a tooth cutting box corresponding to the tooth bounding box.

6. The method of claim 5, wherein the tooth cutting box includes the tooth bounding box and a size of the tooth cutting box is greater than a size of the tooth bounding box.

7. The method of claim 4, wherein the detecting the tooth in the scan data comprises:

generating a tooth landmark by mapping a center point of the tooth bounding box to a tooth surface.

8. The method of claim 7, wherein the extracting the tooth scan data comprises:

extracting the tooth scan data corresponding to the tooth using a tooth cutting area generated based on the tooth landmark.

9. The method of claim 1, wherein the curvature data represents minimum curvature values of the points in the tooth scan data.

10. The method of claim 1, wherein the generating the tooth mapped data comprises:

mapping the curvature data of the tooth scan data to the predetermined space to generate the tooth mapped data.

11. The method of claim 10, wherein inputs of the second artificial intelligence neural network are the tooth mapped data and the tooth bounding box, and wherein an output of the second artificial intelligence neural network is the tooth boundary curve.

12. The method of claim 11, wherein the generating the tooth boundary curve comprises:

rotating the tooth bounding box to generate a diamond contour.

13. An automated method for tooth segmentation of a three dimensional scan data using a tooth boundary curve, the method comprising:

detecting a tooth in the scan data using a first artificial intelligence neural network;

extracting a tooth scan data from the scan data based on a result of a tooth detection;

generating a tooth mapped data by mapping the tooth scan data to a predetermined space based on the tooth scan data;

generating the tooth boundary curve by inputting the tooth mapped data to a second artificial intelligence neural network; and mapping the tooth boundary curve to the scan data, wherein the detecting the tooth in the scan data comprises:

generating a tooth bounding box surrounding the tooth, further comprising:

converting the tooth scan data to a curvature data representing curvature values of points in the tooth scan data, wherein the generating the tooth mapped data comprises:

mapping the curvature data of the tooth scan data to the predetermined space to generate the tooth mapped data, wherein inputs of the second artificial intelligence neural network are the tooth mapped data and the tooth bounding box, wherein an output of the second artificial intelligence neural network is the tooth boundary curve, wherein the generating the tooth boundary curve comprises:

rotating the tooth bounding box to generate a diamond contour, and wherein the generating the tooth boundary curve further comprises:

displacing a position of a vertex of the diamond contour in the tooth mapped data to generate an extreme point.

14. The method of claim 13, wherein the generating the tooth boundary curve further comprises:

generating an octagon contour passing through the extreme points based on the extreme points.

15. The method of claim 14, wherein the generating the tooth boundary curve further comprises:

displacing the octagon contour in the tooth mapped data according to the curvature value to generate the tooth boundary curve.

16. The method of claim 1, wherein the first artificial intelligence neural network is configured to receive the three dimensional scan data and to output three dimensional tooth detection information.

17. A non-transitory computer-readable storage medium having stored thereon program instructions, the program instructions executable by at least one hardware processor to:

detect a tooth of a three dimensional scan data using a first artificial intelligence neural network;

extract a tooth scan data from the scan data based on a result of a tooth detection;

convert the tooth scan data to a curvature data representing curvature values of points in the tooth scan data;

invert grayscales of the curvature data such that an inverted curvature data has a white portion when a minimum curvature value of points is high and a black portion when the minimum curvature value of points is low;

generate a tooth mapped data by mapping the tooth scan data to a predetermined space based on the tooth scan data;

generate a tooth boundary curve by inputting the tooth mapped data to a second artificial intelligence neural network; and map the tooth boundary curve to the scan data.

\* \* \* \* \*